(12) United States Patent
Liu et al.

(10) Patent No.: US 8,261,361 B2
(45) Date of Patent: Sep. 4, 2012

(54) ENABLING SHARING OF MOBILE COMMUNICATION DEVICE

(75) Inventors: Yunxin Liu, Beijing (CN); Yongguang Zhang, Beijing (CN); Lin Zhong, Houston, TX (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 12/402,390

(22) Filed: Mar. 11, 2009

(65) Prior Publication Data

US 2010/0235881 A1 Sep. 16, 2010

(51) Int. Cl.
*G06F 21/00* (2006.01)
(52) U.S. Cl. .................. 726/27; 726/16; 726/26
(58) Field of Classification Search ............ None
See application file for complete search history.

(56) References Cited

U.S. PATENT DOCUMENTS

| | | | |
|---|---|---|---|
| 7,447,854 B1 * | 11/2008 | Cannon ............... | 711/162 |
| 2005/0059418 A1 | 3/2005 | Northcutt | |
| 2007/0038720 A1 | 2/2007 | Reding et al. | |
| 2007/0089111 A1 * | 4/2007 | Robinson et al. ....... | 718/1 |
| 2008/0039139 A1 | 2/2008 | Teicher | |
| 2008/0096603 A1 | 4/2008 | Sparre | |
| 2008/0133208 A1 * | 6/2008 | Stringham .............. | 703/20 |

FOREIGN PATENT DOCUMENTS

WO WO2006035454(A2) 4/2006

OTHER PUBLICATIONS

Spb Software House, "Spb Kiosk Engine/Explorer/Terminal User Manual," Mar. 23, 2007, pp. 3-10.*
Brush, et al., "Yours, Mine and Ours? Sharing and Use of Technology in Domestic Environments", retrieved on Feb. 4, 2009 at <<http://research.microsoft.com/pubs/69498/brushinkpenyoursmineours.pdf>>, UbiComp2007, LNCS 4717, pp. 109-126, 2007.
Chavan et al., "The Dilemma of the Shared Mobile Phone—Culture Strain and Product Design in Emerging Economics", retrieved on Feb. 4, 2009 at <<http://delivery.acm.org/10.1145/1380000/1374497/p34-chavan.pdf?key1=1374497&key2=4343473321&coll=GUIDE&dl=GUIDE&CFID=20951655&CFTOKEN=78335073>>, Interactions Magazine, Jul. and Aug. 2008, pp. 34-39.
Hall, "Create a Windows CE Image That Boots to Kiosk Mode", retrieved on Feb. 4, 2009 at http://msdn.microsoft.com/en-us/library/aa446914(printer).aspx>>, Microsoft Corporation, Mar. 2006, 5 pages.

(Continued)

*Primary Examiner* — Jung Kim
*Assistant Examiner* — Robert Leung
(74) *Attorney, Agent, or Firm* — Lee & Hayes, PLLC; Shirley L. Anderson (57) ABSTRACT

Various exemplary user interfaces, methods and computer program products describe enabling sharing of mobile communication devices. This process utilizes a shared mode for an owner of the mobile communication device to create a virtual environment for a borrower of the mobile communication device, which allows content information (e.g., certain applications and files) to be accessible and visual to the borrower. The process allows an owner of the mobile communication device to track and to manage data created or changed by the borrower. The owner may accept or reject the changes made in the content information. Furthermore, the process conceals non-shared resources to the borrower.

20 Claims, 10 Drawing Sheets

OTHER PUBLICATIONS

Hull, "Enabling Context-Aware and Privacy-Conscious User Data Sharing", retrieved on Feb. 4, 2009 at <<http://ieeexplore.ieee.org/stamp/stamp.jsp?arnumber=01263065>>, Proceedings of the 2004 IEEE International Conference on Mobile Data Management (MDM 2004), 12 pages.

Hunt, et al., "Detours: Binary Interception of Win32 Functions", retrieved on Feb. 4, 2009 at <<http://research.microsoft.com/~galenh/Publications/HuntUsenixNt99.pdf>>, Proceedings of the 3rd USENIX Windows NT Symposium, Seattle, WA, Jul. 1999, pp. 1-9.

Hunt, et al., "Intercepting and Instrumenting COM Applications", retrieved on Feb. 4, 2009 at <<http://research.microsoft.com/pubs/68567/huntcoots99.pdf>>, Proceedings of the 5th Conference on Object-Oriented Technologies and Systems (COOTS 1999), pp. 1-12.

Jain, et al., "Application-Level Isolation and Recovery with Solitude", retrieved on Feb. 4, 2009 at <<http://www.eecg.toronto.edu/~ashvin/publications/solitude-eurosys.pdf>>, EuroSys 2008, Apr. 1-4, 2008, Glasgow, Scotland, UK, 13 pages.

Kamp, et al., "Jailis: Confining the omnipotent root", retrieved on Feb. 4, 2009 at <<http://phk.freebsd.dk/pubs/sane2000-jail.pdf>>, The FreeBSD Project, 15 pages.

Liang, et al., "Isolated Program Execution: An Application Transparent Approach for Executing Untrusted Programs", retrieved on Feb. 4, 2009 at <<http://www.comp.nus.edu.sg/~liangzk/papers/acsac03.pdf>>, Department of Computer Science, Stony Brook University, New York, 11 pages.

Ligneris, "Virtualization of Linux based on computers: the Linux-VServer project", retrieved on Feb. 4, 2009 at <<http://ieeexplore.ieee.org/stamp/stamp.jsp?arnumber=1430092&isnumber=30845>>, Proceedings of the 19th International Symposium on High Performance Computing Systems and Applications (HPCS 2005), 7 pages.

McCarthy, "Share your mobile phone photos with Radar", retrieved on Feb. 4, 2009 at <<http://news.cnet.com/8301-17938_105-9679345-1.html>>, Crave—CNET, Jan. 19, 2007, 2 pages.

Olson, et al., "A Study of Preferences for Sharing and Privacy", retrieved on Feb. 4, 2009 at <<http://research.microsoft.com/en-us/um/people/horvitz/privacy_chi2005.pdf>>, CHI 2005; Apr. 2-7, 2005, Portland, Oregon, USA, 5 pages.

Pering, et al., "Face-to-Face Media Sharing Using Wireless Mobile Devices", retrieved on Feb. 4, 2009 at <<o:\docs\MS1\3872US\GW1098.PDF>>, Proceedings of the Seventh IEEE International Symposium on Multimedia (ISM 2005), 8 pages.

Price, et al., "Solaris Zones: Operating System Support for Consolidating Commercial Workloads", retrieved on Feb. 4, 2009 at <<http://www.sun.com/bigadmin/content/zones/zones_lisa.pdf>> 2004 LISA XVII—Nov. 14-19, 2004—Atlanta, GA, pp. 243-256.

"Privacy Policy" retrieved on Feb. 4, 2009 at <<http://www.aka-aki.com/more/privacy>>, 2007-2009 aka-aki networks GmbH, 6 pages.

"Simply and Securely Share Your Contact Information Anywhere with myCard", retrieved on Feb. 4, 2009 at <<http://iphonenews.desinformado.com/index.php/2009/01/07/simply-and-securely-share-your-contact-information-anywhere-with-mycard/>>, IPhone News At Designformado, Jan. 7, 2009, 6 pages.

Soltesz, et al., "Container-based Operating System Virualization: A Scalable, High-performance Alternative to Hypervisors", retrieved on Feb. 4, 2009 at <<http://www.cs.princeton.edu/~mef/research/vserver/paper.pdf>>, Princeton University and Linux VServer Maintainer, pp. 1-14.

"Spb Kiosk Engine", retrieved on Feb. 4, 2009 at <<http://www.spbsoftwarehouse.com/products/kioskengine/>>, Spb Software, 1 page.

Voida, et al., "Listening In: Practices Surrounding iTunes Music Sharing", retrieved on Feb. 4, 2009 at <<http://pages.cpsc.ucalgary.ca/~avoida/Site/Job_Materials_files/listeningIn-chi05.pdf>>, CHI 2005, Papers: Personal Technologies, Apr. 2-7, Portland, Oregon, USA, pp. 191-200.

Yu, et al., "A Feather-weight Virtual Machine for Windows Applications", retrieved on Feb. 4, 2009 at <<http://www.ecsl.cs.sunysb.edu/tr/TR189.pdf>>, VEE 2006, Jun. 14-16, Ottawa, Ontario, Canada, 11 pages.

"ZYB offers free online backup and sharing of mobile phone data", retrieved on Feb. 4, 2009 at <<http://www.gizmag.com/go/5797/>>, Jun. 27, 2006, gizmag 2003-2009, 2 pages.

* cited by examiner

ENABLING SHARING OF MOBILE COMMUNICATION DEVICE

TECHNICAL FIELD

The subject matter relates generally to mobile communication devices, and more specifically, to sharing a mobile communication device with another individual.

BACKGROUND

Typically, a mobile communication device is a personal device meant for a single user or an owner, loaded with personal data (e.g. photos, contacts, text messages (SMSes), or call history). It may be desirable to share the mobile communication device with other users or borrowers for various purposes. This is especially true as mobile communication devices are increasingly integrating features conventionally provided by dedicated devices, from MP3 players to game consoles.

A problem that exists for the owner when sharing the mobile communication device with other users or borrowers is that the owner gives complete access to a borrower, since existing mobile communication devices provide little protection for private data and pay-per-use applications. This problem has made sharing less acceptable and has prevented mobile communication device owners from sharing, when it may be socially desirable. Consequently, when the owner shares their communication device, the borrower has the same access to the private data and unlimited access to pay-per-use applications as the owner.

Another problem with sharing the mobile communication device is determining the amount of call minutes or text messaging used on a mobile communication device plan. In certain circumstances, the owner and the borrower may be sharing costs for the mobile communication device plan. Thus, there is no mechanism for the owner to determine a cost to the borrower.

Various attempts have been made to have restriction features in mobile communication devices. One attempt for the mobile communication device is to use a password to prevent unauthorized access; yet the password is set for the entire system and therefore the access control is an all or nothing approach. Some of the restriction features would disable some built-in applications. Some of these approaches require booting into a less-known "kiosk" mode allowing certain applications to run. However, these approaches do not work for a third-party, do not provide access control to data, or do not work without requiring a reboot. Thus, these approaches make it impractical to share mobile communication devices without a restricted mode.

Therefore, it is desirable to find ways for the owner of the mobile communication device to share the mobile communication device with another individual, while providing access control of private data and applications for the owner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes various exemplary methods, user interfaces, and computer program products for sharing a mobile communication device with transition modes. The process creates a profile to share content information in a shared mode and identifies the content information that is accessible for the shared mode. The process provides access to the content information for the shared mode, while simultaneously hiding other parts of the content information that were not selected for the share mode for a borrower.

BRIEF DESCRIPTION OF THE DRAWINGS

The Detailed Description is set forth with reference to the accompanying figures. The teachings are described with reference to the accompanying figures. In the figures, the leftmost digit(s) of a reference number identifies the figure in which the reference number first appears. The use of the same reference numbers in different figures indicates similar or identical items.

DETAILED DESCRIPTION

Overview

This disclosure is directed to various exemplary methods, user interfaces, and computer program products for enabling to share a mobile communication device with transition modes. Traditional mobile communication device uses a password to access the mobile communication. However, the password access typically focused on a single use approach for one owner, without leveraging sharing of the mobile communication device and is not concerned with providing access control of private content information. Thus, the sharing of mobile communication devices with transition modes described herein allows owners to share their mobile communication devices by providing access to content information, while simultaneously hiding private content information in the process.

In one aspect, the process provides an interface having computer-readable instructions that, when executed by a processor, cause the processor to perform acts such as creating a profile. The acts include creating a profile to share content information in a shared mode for a borrower. The content information may include files, folders, pictures, videos, text messages, or applications. The acts further include identifying the files, folders, pictures, videos, text messages, or applications that are accessible for the shared mode, and providing access to the profile for the shared mode while simultaneously hiding or concealing other parts of the content information not selected to be included in the share mode.

In another aspect, there is a process computer-readable storage media with computer instructions that are executable by a processor for selectively sharing data and applications. The process establishes a sharing policy that includes access to a shared file selection, a shared application selection, or a resource allowance specification. The computer-readable media creates a shared mode by presenting a virtual environment to enable the sharing policy to allow access to the one or more files located in the shared mode and concealing the files in the owner mode that are not identified in the shared policy. The process identifies one or more changes implemented to the one or more files in the shared mode by directing the one or more changes to a separate folder, without modifying the one or more files in the owner mode.

In yet another aspect, the user interface includes selecting content information to share in one or more multiple display screens, the content information comprises at least one of files, folders, pictures, videos, text messages, or applications. The user interface creates a profile mode for one or more selection choices for the content information to be shared, and provides access to the profile mode for the selected choices, while simultaneously keeping other parts of the content information secret and hidden.

The described sharing of the mobile communication device with transition modes method improves privacy and convenience to the owner during sharing of the mobile communication device. Furthermore, the sharing method prevents changes to the content information, unless the owner accepts the changes. By way of example and not limitation, the sharing method described herein may be applied to many contexts and environments. The sharing method may be implemented to support sharing mobile communication devices among individuals at universities, hospitals, offices, restaurants, sporting events, meetings, and the like.

Illustrative Environment of Sharing Mobile Communication Device

Figure 1:
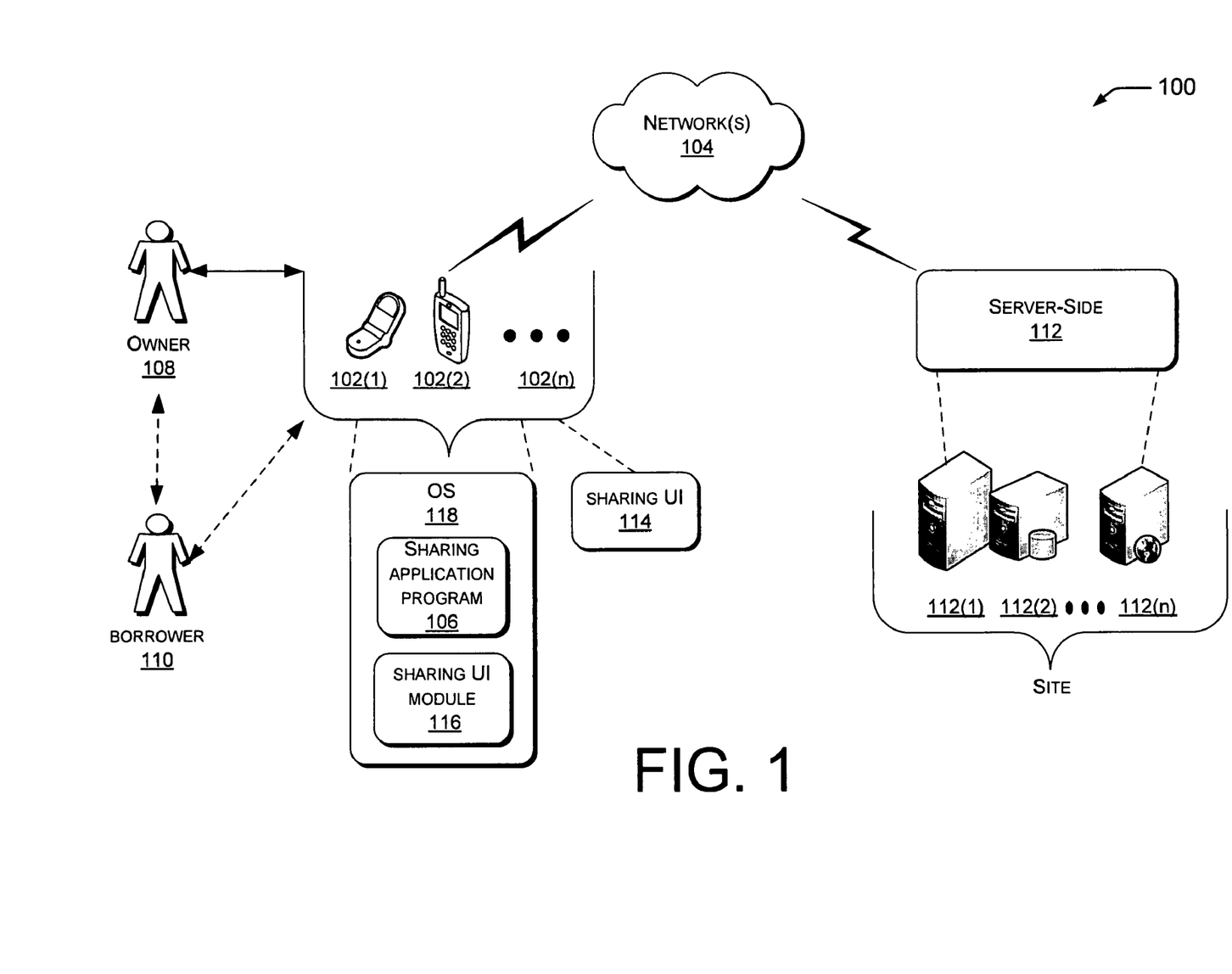
FIG. 1 is a block diagram of an exemplary communication environment with communication devices configured to present subject matter using various implementations of a sharing application and a user interface (UI).

FIG. 1 is an overview block diagram of an exemplary system 100 for sharing a mobile communication device using transition modes. Shown are exemplary communication devices 102. Communication devices 102 that are suitable for use with the system 100, include, but are not limited to, a cellular communication device 102(1), a smart communication device 102(2), a mobile communication device, a personal digital assistance, a laptop, or a mobile cellular phone, and the like 102(n). The communication device 102 may include a display for a user interface to view content information for creating share modes. The term "content information" may describe applications, files, folders, calls, messages, or call history, the content information including video, voice, multimedia, email, text, photographs, data, and the like. The communication devices 102(1) . . . 102(n) are capable of connecting to one or more networks, as represented by network 104.

The network 104 is representative of any one or combination of multiple different types of networks, interconnected with each other and functioning as a single large network (e.g., the circuit-switched telephone networks or IP-based packet-switch networks). The network 104 may also include wire-based networks (e.g., cable) and wireless networks (e.g., cellular, satellite, etc.). The network 104 may use any number of protocols and configurations to enable the communication devices 102(1) . . . 102(n) to access other devices and resources. The network 104 may include several types of circuit-switched telephone networks, such as Public Switched Telephone Network (PSTN) and packet-switched networks. For example, the network 104 may include Global System for Mobile communication (GSM)/UMTS cellular network, a Code Division Multiple Access (CDMA) cellular network, other types of circuit-switched networks and/or the Internet.

The system 100 may include sharing of mobile communication device using transition modes as, for example, but not limited to, a tool, a method, a solver, software, an application program, a service, technology resources which include access to the Internet, part of a Web browser, user interface, and the like. The terms "sharing of mobile communication device(s)", "sharing application program", and "sharing of mobile communication device with transition modes" are used interchangeably. Here, the sharing of mobile communication device is implemented as an application program 106 operating on an operating system. In another implementation, the sharing of mobile communication device may be provided as a service.

The sharing application program 106 makes it more convenient for a user or an owner 108 to share the mobile communication device with another individual. The program 106 offers protection of private content information on the mobile communication device 102. Terms "owner", "user", and "account holder" may be used interchangeably to describe a person or an entity owning the mobile communication device 102 and/or a person or an entity subscribing to a consumer telecommunication services. The sharing application program 106 allows the owner 108 to share the mobile communication device 102 with a borrower 110, by creating a shared mode to provide access to certain content information on the mobile communication device 102, while concealing personal and/or private content information.

Shown in FIG. 1 is a representative set of servers 112(1) . . . 112(n) that is accessible via the network 104. The servers 112(1) . . . 112(n) may be independent servers, or a collection of servers that are configured to perform larger scale functions (e.g., a server farm), or a set of servers configured to host one or more sites (e.g., websites) accessible by the network 104. In the illustrated example, the servers 112(1) . . . 112(n) may represent private servers that serve content information and programming to the mobile communication device 102. Alternatively, the servers 112(1) . . . 112(n) may represent a wireless services provider that provides content to wireless devices, such as the portable handheld communication device 102. In still other implementations, the servers 112(1) . . . 112(n) may be configured to host a site, such as a website accessible by anyone of the communication devices via the Internet 104.

This environment 100 also illustrates a sharing transition mode user interface (UI) 114 that may be employed. Each communication device 102 may present the sharing transition mode UI 114 to the owner 108. In a first example operating environment, the mobile communication device 102 presents a transition mode UI 114 on the display. The transition UI 114 is implemented as a share UI module 116 as part of an operating system 118 that is stored and executed by the mobile communication device 102. A more detailed discussion of these examples is described below with reference to FIGS. 5-8.

Illustrative Overview Process for Sharing Application Program

Figure 2:
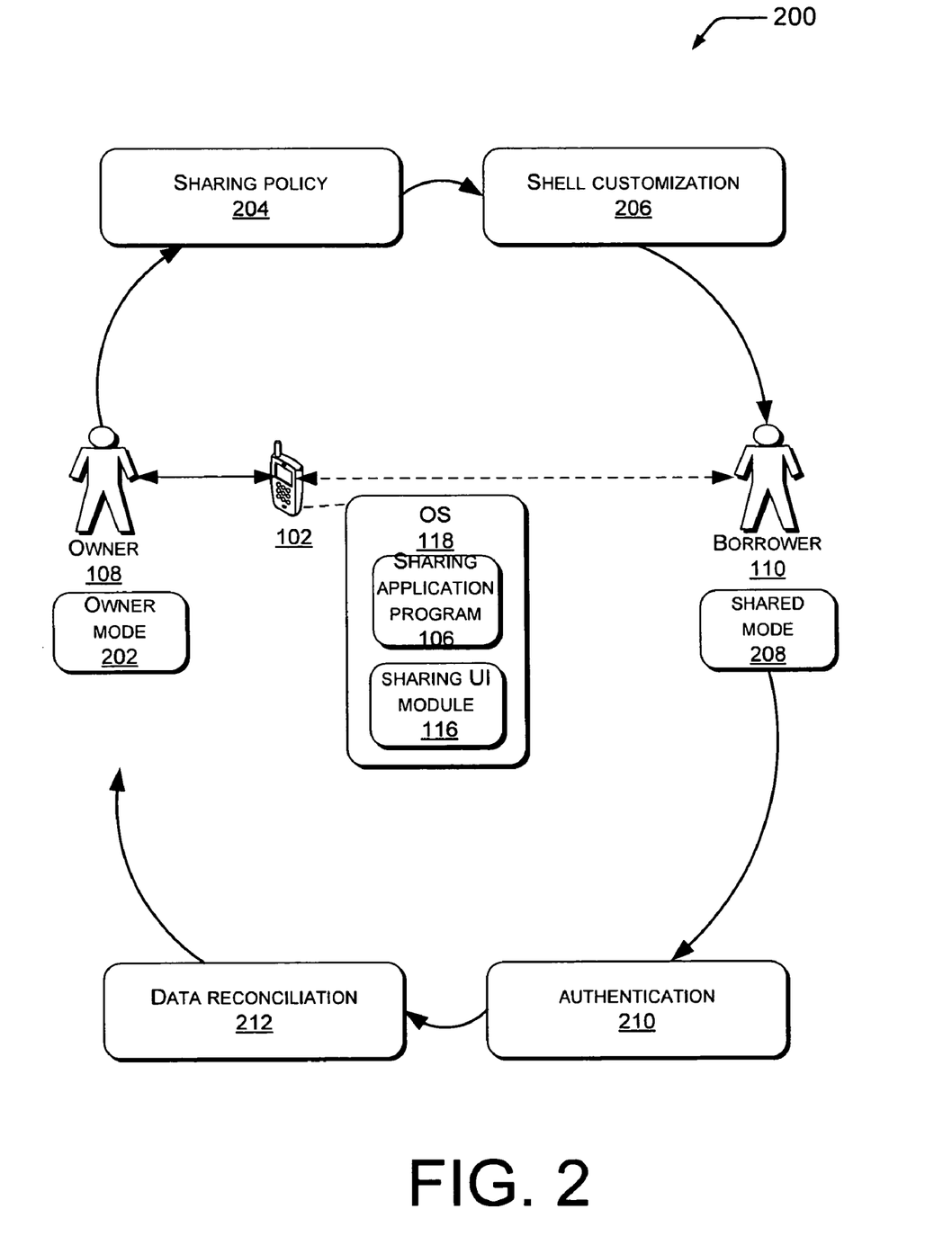
FIG. 2 is an overview flowchart showing an exemplary process for mode transitions of the sharing application of FIG. 1.

Illustrated in FIG. 2 is an overview exemplary flowchart of a process 200 for implementing the sharing of mobile communication device with transition modes application program 106 that provides a benefit to owners in managing and tracking sharing the content information on the mobile communication device 102. For ease of understanding, the method 200 is delineated as separate steps represented as independent blocks in FIG. 2. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

The flowchart for the process 200 provides an exemplary implementation of the sharing application program 106 of FIG. 1. Shown are the communication device 102, the sharing application program 106, the user interface module 116, and the operating system 118. There are two modes of operation in this process 200, an owner mode and a shared mode.

Starting at block 202, represents a first mode, referred to as the owner mode or a normal mode for implementing sharing application program 106. In the owner mode or the normal mode 202 the sharing application program 106 is a regular application that can be launched and closed, and does not affect the operation of other applications. When the sharing application program 106 transitions to a second mode which is the shared mode, the sharing application program 106 runs in the background.

Shown next is block 204, which represents specifying a sharing policy of the content information to share on the mobile communication device 102 with the borrower 110. The sharing policy 204 allows the owner 108 to promptly enter selections and the sharing policy 204 quickly implements the selections into operation. The owner 108 selects content information, which includes at least one of files, folders, pictures, videos, text messages, applications, and the like. In an implementation, the sharing policy 204 may include at least three components: shared files selection, shared services or application selections, and a resource allowance specification.

There are several design considerations when specifying the sharing policy 204. The operating system 118 associates a default application to most file types, the sharing application program 106 asks the owner 108 to select the files before applications; and then automatically selects appropriate applications for the files the owner 108 selects for sharing, which can be overridden by the owner 108.

Furthermore, the owner 108 specifies whether the file or the application is shared or not in the sharing policy 204. Applications that are identified as shared applications will be run, and the sharing application program 106 gives the shared applications read and write access to shared files, as well as permission to create new files. Initially, all items start as not being shared, except those applications that are automatically selected based on the shared data file types.

In an implementation, the sharing application program 106 creates profiles to enable the owner 108 to save frequently used sharing policies. The owner 108 creates a profile for one or more selection choices for the content information that is shared with the borrower 110. The sharing application program 106 provides access to the content information for the selected choices in the profile mode, while simultaneously hiding or concealing other parts of the content information that were not selected to be shared. The owner 108 may create several profiles for various borrowers, depending on the number of borrowers.

Block 206 represents shell customization. When the owner 108 hands the mobile communication device 102 to the borrower 110, the mobile communication UI 116 in relation to the permitted applications should be consistent with their original UI. Applications and data that are not intended for sharing should be concealed from the shell 206. Because the owner 108 has become accustomed to launching applications from the shell, removing the links to the non-shared applications will provide consistency between the user interface and functionalities.

The process 200 next proceeds to the second transition mode, which is also known as the shared mode 208, which is a temporary mode. The shared mode is temporary to allow the borrower 110 to use the mobile communication device. The process 200 further illustrates how the sharing application program 106 may provide a quick launch subprogram or method, called Quick Share. With Quick Share, the sharing application program 106 enters the shared mode 208, allowing access to the current front application and the files currently opened by Quick Share. To use Quick Share, the owner 108 first launches the sharing application program 106, brings the application to share to the front and opens the files to be shared, and then confirms Quick Share from the sharing application program 106.

As part of the operating process, the sharing application program 106 obtains a list of sharable files and applications from the operating system 118. This is possible because mobile operating systems store user-created data into a specific folder and install applications or the respective links in a fixed folder. A hierarchical list-based selection listing all possible choices is used. For file sharing, a hierarchical list similar to the built-in file browser is used to enable the owner 108 to explore and to select individual folders and files. Each item on the list has an indicator that indicates a sharing status of the file, the folder, or the application. In the user interface, clicking on an indicator changes the sharing status.

Furthermore, once the files to be shared are identified, the sharing application program 106 creates a file that contains the sorted list of all shared files, which may be referred to as a container file or a shared file. In the shared mode 208, the sharing application program 106 loads the container file or the shared file into memory and employs a binary search to determine whether a given file is in the list and whether access to the file should be granted to the borrower 110.

In an implementation, the sharing application program 106 creates a virtual environment for the shared mode 208 from the sharing policy 204. The sharing application program 106 runs in the background, customizes the shell 206, and enforces the sharing policy 204 based on the owner's specification. The virtual environment confines access to the shared data and applications through a resource namespace virtualization based on a file-level access control. The resource namespace virtualization gives access control and concealment of other applications and data that are not to be shared. In the virtual environment, the sharing application program 106 tracks all changes made by permitted applications and allows the owner 108 to manage the changes when exiting the shared mode 208.

The shared mode 208 allows the borrower 110 to use the mobile communication device 102. The sharing application program 106 may further allow the owner 108 to specify quotas for exhaustible resources used in a sharing session. The resource allowance specification may identify quotas for resources used for the borrower profile, the quotas for the processor located on the mobile communication device 102 including but not limited to a battery usage, a unit of storage on the mobile communication device 102, and SMS and data counts for texting, or a number of minutes for using the mobile communication device 102.

When switching from the shared mode 208 back to the owner mode 202, a user authentication 210 is required. The user authentication 210 may include but is not limited to a password, a code, a user identification, or the like. In an implementation, there may be a password or user authentication for the owner to identify before entering the shared mode.

The sharing application program 106 tracks changes made by the borrower 110 in the shared mode 208. When exiting from the shared mode 208, the sharing application program 106 prompts the owner 108 to manage changes made to files and settings in the shared mode 208. The sharing application program 106 provides another UI for the owner 108, a borrower data reconciliation 212. The user interface displays the changes and their locations in a UI similar to the policy specification UI. The owner 108 manages the content information that was created or modified by the borrower 110 during the borrower data reconciliation 212. The owner 108 may either accept or reject changes made in the shared mode 208. The default choice for modified items is reject; the default for new files is accept. Traditionally, most file sharing is intended for read only access, e.g. music and pictures. In contrast, many shared applications are intended for the borrower to create files, e.g. the camera. Thus, the rationales for the default rejecting or default accepting are based on history of users.

Exemplary Architecture of Shared Mode

Figure 3:
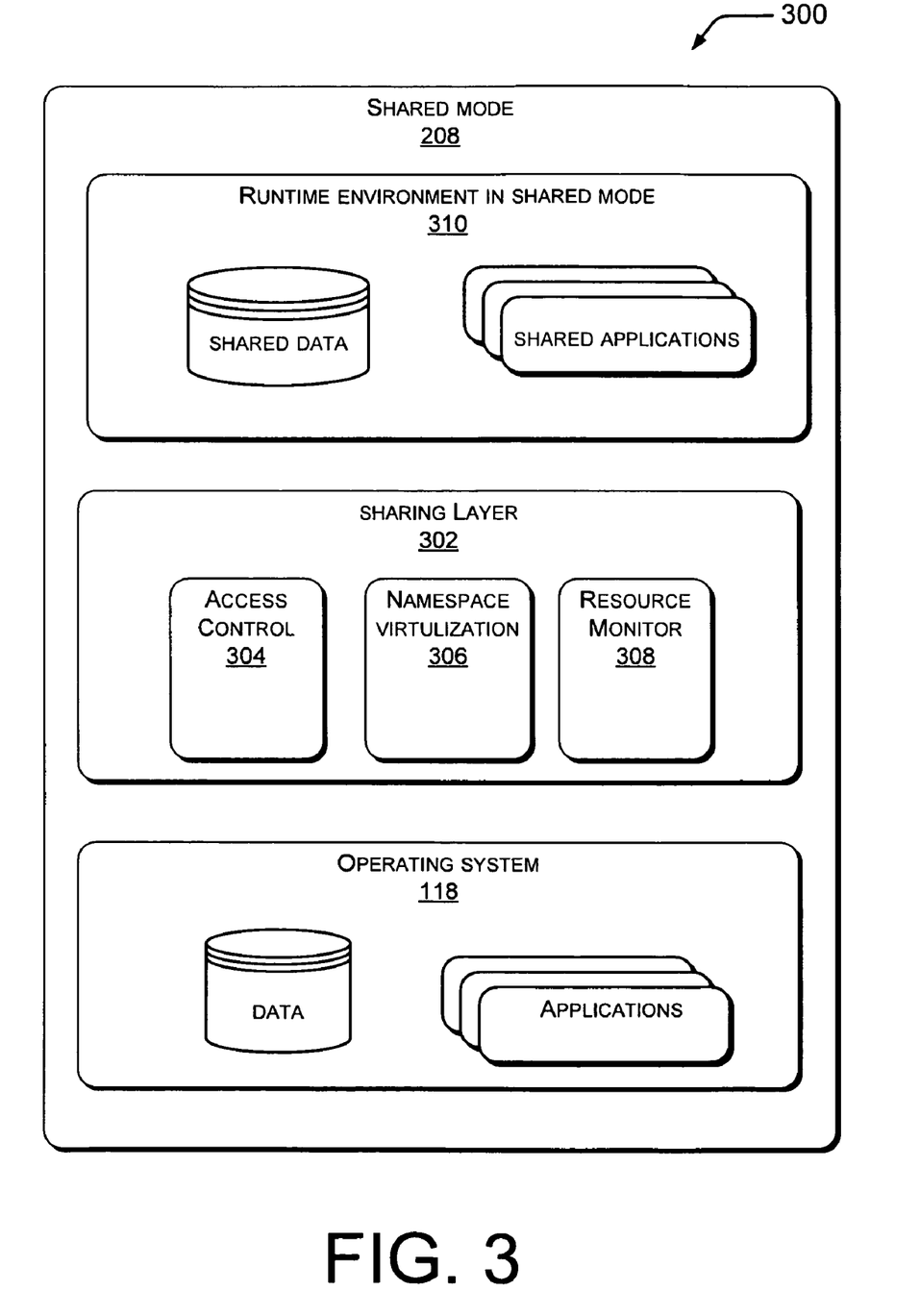
FIG. 3 is a block diagram of an exemplary architecture of the shared mode approach of FIG. 2.

FIG. 3 is an exemplary architecture 300 for the shared mode 208 of the sharing application program 106. Shown is a native operating system 118 with data and applications that the owner 108 has on his or her mobile communication device 102.

Block 302 represents the sharing layer which includes an access control 304, a namespace virtualization 306, and a resource monitor 308.

Access control 304 represents impromptu configurable access control to applications and data. Once the owner 108 specifies the sharing policy 204, the sharing application program 106 rapidly identifies the files in granting access in order to block access to non-shared applications and data.

An issue is that mobile operating systems can keep some key services and recently used applications in memory to expedite their launch. Such services and applications create a challenge to access control 304 when shared, due to the private data loaded. For example, on Windows Mobile®, all SMSes are stored in file cemail.vol, which is kept opened by the Windows® CE Messaging Application Programming Interface (CEMAPI) service throughout its lifetime. As a result, if the owner 108 allows the borrower 110 to use the SMS application, the owner 108 may inadvertently allow the access to the SMS history. Most shared applications and services can be stopped or terminated without any impact on the rest of the system. Therefore, the sharing application program 106 simply terminates the corresponding processes before entering the shared mode 208.

Many applications require more than their executables to run, e.g. configuration files and DLLs. The sharing application program 106 locates an adequate set of files for the application to run properly. It is generally difficult to distinguish files necessary for the application to run, from private data files that are opened by the owner in that application. However, most mobile operating systems store application files and data files into different folders, including Windows Mobile®, Symbian, and iPhone OS. Therefore, the sharing application program 106 allows access to all of the files in the same folder as the corresponding executable. Some applications may access non-storage peripheral devices, such as the camera and the microphone. These non-storage peripherals do not contain any private information, therefore, the sharing application program 106 grants access to them in the shared mode 208.

Namespace virtualization 306 is a natural choice for sandboxing the shared applications and data to implement access control and a virtual environment for the shared mode 208. The namespace virtualization 306 controls resource access by renaming the resources for each folder or file, redirecting write access to another space, and concealing unshared files.

Namespace virtualization 306 allows sharing application program 106 to separate changes made to the files and the settings in the shared mode 208 and ensure those changes cannot affect the system in the owner mode 202. As previously mentioned, the sharing application program 106 asks the owner to decide which files or directories to share in the sharing policy 204. Once a file is shared, the sharing application program 106 allows both read and write accesses to the file in the shared mode 208. To protect the shared files from unwanted modification, the sharing application program 106 creates a private folder to hold the modified and created files in the shared mode 208. Instead of changing the original files, the sharing application program 106 uses a copy-on-write to re-direct all the changes to the private folder.

Through the namespace virtualization 306, the sharing application program 106 hides non-shared resources from shared applications in the shared mode 208 to provide a consistent system view in the shared mode 208. For example, the owner 108 may want to share two of the five files in a folder. Thus, in the shared mode 208, the borrower 110 will only see the two shared files, while the process conceals the other three files.

The resource monitor 308 helps with the resource allowance specification that identifies quotas for resources used during a borrower profile. The owner 108 is concerned with the over-usage of exhaustible system resources, such as battery, storage, and network chargeable features, such as phone minutes, SMS and data counts. Existing mobile operating systems provide APIs to assess battery capacity and file sizes, while the sharing application program 106 leverages them for battery and storage usage accounting.

Shown in FIG. 3 is a runtime environment in shared mode 310. The shared mode 208 in the runtime environment shows shared data and shared applications.

Exemplary API Interception for Sharing Mobile Communication Device

Figure 4:
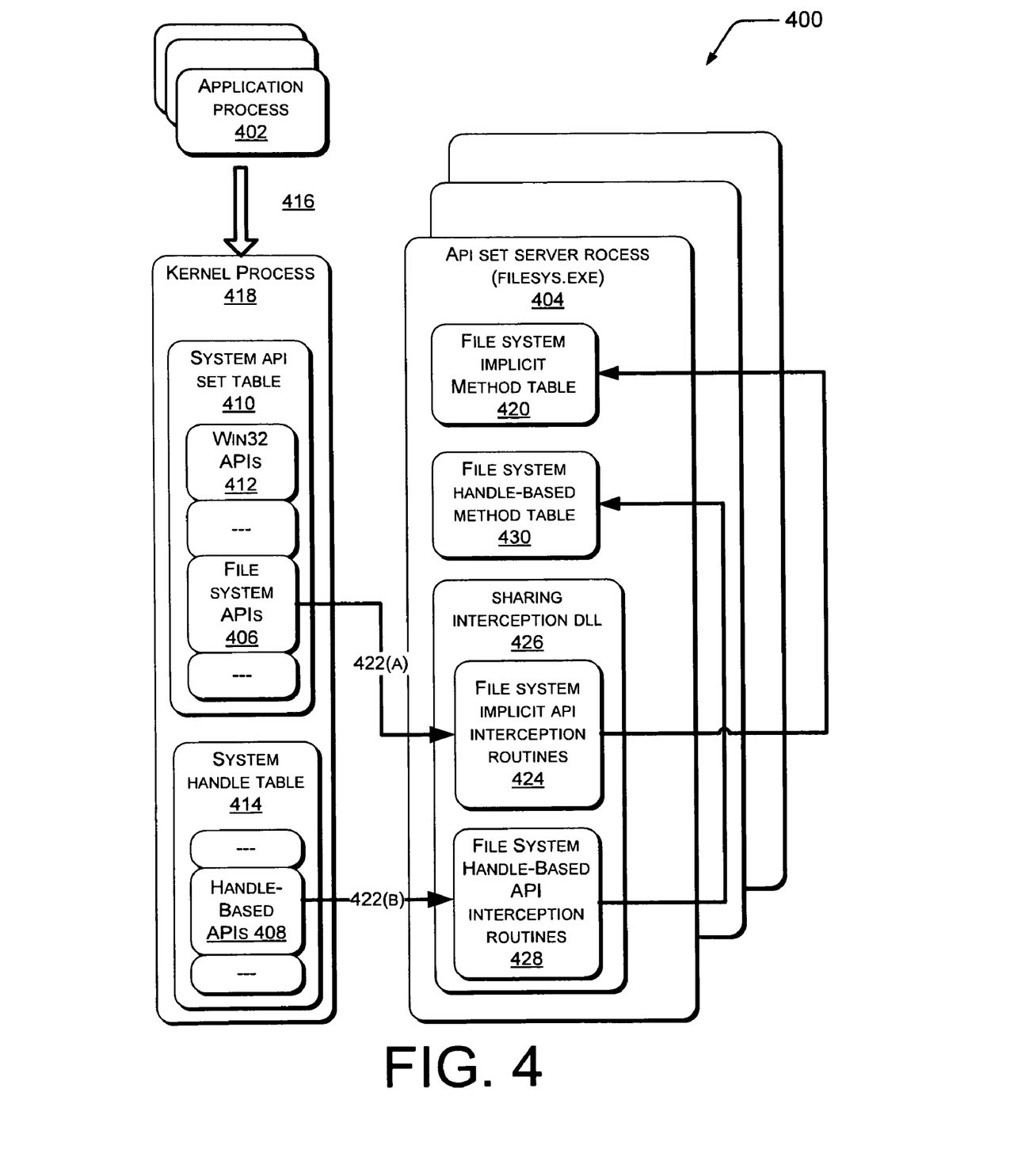
FIG. 4 is a block diagram of an exemplary application programming interface for the sharing application program on an operating system.

FIG. 4 is a block diagram of an exemplary process 400 for a kernel-level application programming interface (API) interception for file access control 304 by an application process 402, on the mobile communication device 102. While the exemplary process 400 focuses on an implementation on the Windows Mobile® Operating System, offered by Microsoft® Corporation, some components are common to other mobile device operating systems, such as iPhone Operating System, offered by Apple Inc.

On Windows Mobile®, the applications use system application programming interface (API) to access files. API interception is a natural choice for file-level access control 304 because applications use system APIs to access files. For example, an application running on Windows Mobile® can use the CreateFile( ) function call to open a file. Furthermore, CreateFile( ) is called to open an executable file when the application is launched. The file access control 304 can be implemented at either the user-level or the kernel-level. However, the user-level implementation requires changing the ROM image on the mobile communication device 102 because Windows Mobile® extensively uses eXecution-In-Place (XIP) technique, to execute native programs and DLLs directly from ROM without copying them into RAM, and need to change the import address tables of programs or the export address tables of DLL. The file-level access control 304 can be implemented by intercepting system APIs at the kernel-level.

The sharing application program 106 generates the container file based on the user-specified sharing policy 204. The sharing application program 106 employs an interception routine for CreateFile( ) to enforce the sharing policy 204. The routine takes the path parameter passed to CreateFile( ) and looks it up in the container file using a binary search to determine whether access to the file should be granted. If so, it calls the original CreateFile( ) to open the file and returns the file handle. Otherwise, it denies access by returning an error. Because CreateFile( ) is called to open the executable when an application is launched, the interception routine ensures access control for both files and applications.

Windows Mobile® uses a client/server model for file system APIs and implements all file system APIs in one separated server process 404. The file system APIs are either implicit file system APIs 406 or handle-based APIs 408. Implicit file system APIs 406 are globally registered and dispatched through the system API set table 410, e.g. CreateFile( ). The system API set table 410 in FIG. 4 also includes a plurality of Win32® APIs 412.

Handle-based APIs 408 are attached to a kernel object such as a file or an event, and called through a handle in a system handle table 414 to the kernel object. For example, CreateFile( ) function call is illustrative of the implicit file system API 406, and WriteFile( ) function call is illustrative of the handle-based API 408. The arrows in FIG. 4 illustrate intercepting both implicit 406 and handle-based API sets 408, using file system APIs as an example.

In the owner mode 202, when an application process 402 calls the implicit file system API 406, the application process 402 causes a trap 416 and jumps into the kernel process 418. Without the sharing application program 106 implemented, the kernel process 418 searches the system API set table 410 for the address of a method implementing the file system API and calls the method, which is located in a file system implicit method table 420.

However, the sharing application program 106 rewrites the functions. The system API set table 410 is located at a fixed memory address, the sharing application program 106 intercepts system APIs by locating the implicit file system API 406 and manipulating the corresponding table entries. As shown by the arrow 422(A), the process locates the implicit file system API 406, intercepts to file system implicit API interception routines 424 and then to the file system implicit method table 420. The sharing application program 106 implements interception routines in sharing interception DLL 426, loads the routines into the address space of the API set server process 404, and directs the corresponding entry in the system API set table 410 to the interception routine 424. The interception DLL 426 also holds the pointer to the original table in the server process 404 so that the interception routines can call the original system API methods, if the access control checking is passed.

Replacing entries in the system API set table 410 can only intercept file system implicit APIs 406. As all handles are created in implicit APIs, their creation in corresponding implicit interception routines can be tracked. Before returning the handles 408 to applications, the file system handle-based interception routines 428 are attached to the handle-based APIs 408. As a result, all calls to the handled-based APIs 408 are directed to the sharing interception DLL 426, where the original API methods are called to perform the work according to the currently active sharing policy 204.

The sharing interception DLL 426 holds a pointer to the file system implicit method table 420 in the API set server process 404 allowing one or more interception routines 424 to call the original file system API methods in the file system implicit method table 420 if the access control checking is passed. Where the access control checking fails, such as when attempting to open a non-shared file, the corresponding interception routine 424 returns an error (not shown).

Handle-based system APIs 408 are created in implicit file system APIs 406. Thus, in the shared mode 208, creation of a file handle 408 is tracked in a corresponding implicit interception routine 428, as described above in regard to implicit file system APIs 406. When a creation of a file handle 408 is intercepted and before the handle 408 is returned to a corresponding application, such as application 402, a handle-based interception routine 428 from the sharing interception DLL 426 is attached to the file handle 408.

After the interception routine 428 is attached to the file handle 408, calls made in the shared mode 208 to the handle-based system APIs 408 are directed to the sharing interception DLL 426, instead of being directed to the file system handle-based method table 430. The sharing interception DLL 426 processes the handle-based system APIs 408 according to the current access control 304. The sharing interception DLL 426 holds a pointer to the file system handle-based method table 430 in the API set server process 404 allowing one or more handle-based interception routines 428 to call the original file system API methods in the file system handle-based method table 430 pursuant to the current access control 304. As shown by the arrow 422(B), the process 400 locates the handle-based APIs 408, intercepts to file system handle-based API interception routines 428 and then to the file system handle-based method table 430.

The sharing interception DLL 426 is loaded into the corresponding server process to intercept the file system APIs. The capability of Windows Mobile® is leveraged to perform a callback function in the given process 400. By setting the callback function to LoadLibrary( ) and the parameter as the name of a DLL, the process 400 is forced to execute LoadLibrary( ) to load the DLL into its address space. Similarly, the process 400 is unloaded by setting the callback function to FreeLibrary( ). Using this approach, the sharing interception DLL 426 may be dynamically loaded and unloaded. When switching between the owner mode 202 and the shared mode 208, the sharing application program 106 automatically changes the system API set table 410 and loads or unloads its interception DLL 426 for the target processes.

Sharing Mobile Communication User Interface

FIGS. 5-8 illustrate the exemplary sharing user interface. The sharing user interface functions similar to the method and computer programming products described above. Shown in the diagrams are exemplary sharing user interfaces.

When the sharing application program 106 is launched for the first time, the user interface prompts the owner 108 to set a password and then stores the MD5 hash code of the password in a registry key. In the shared mode, the registry key is visible only to sharing application program 106 through access control. To switch back to the owner mode, the owner 108 should input the password correctly.

Figure 5:
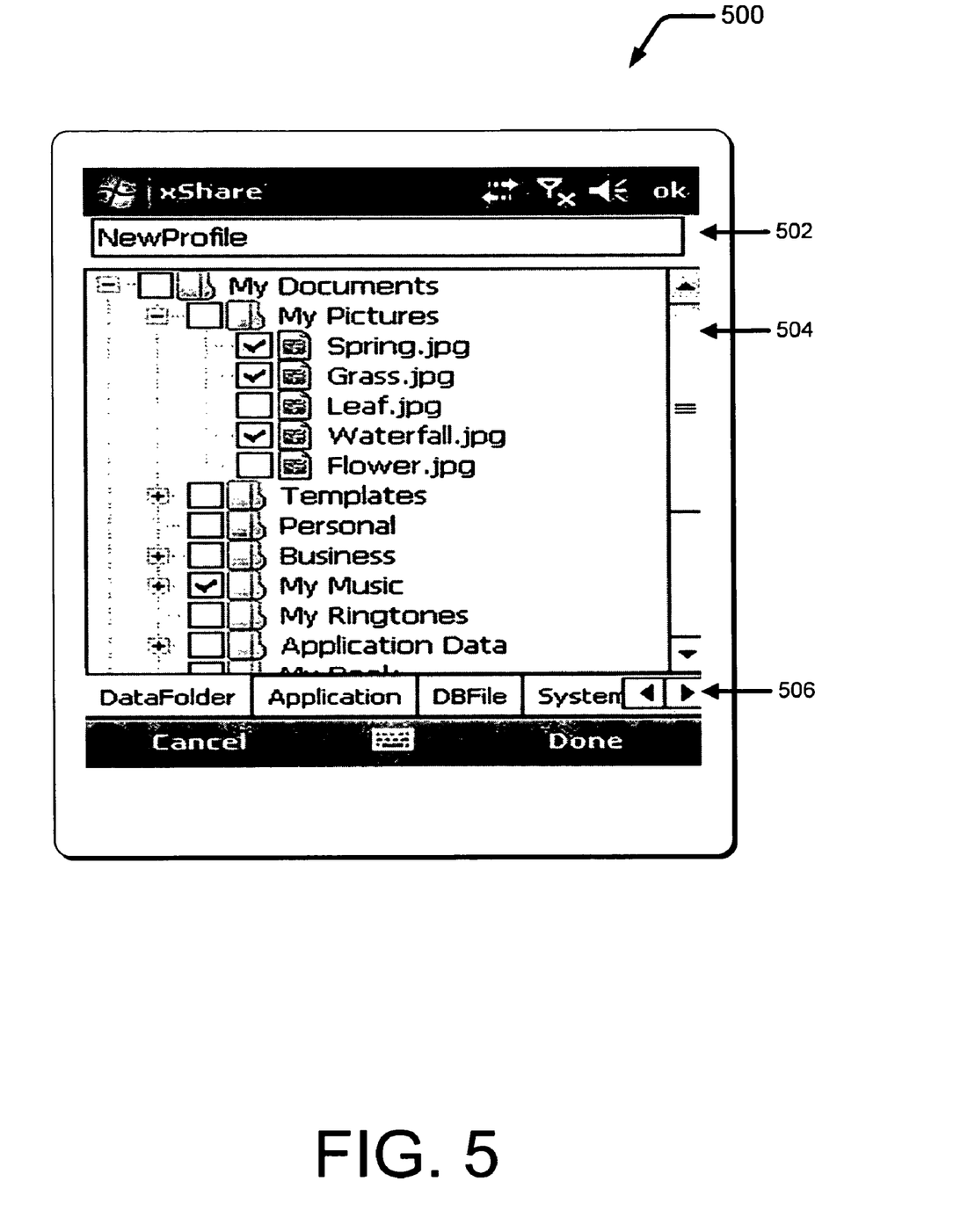
FIG. 5 is a block diagram showing an exemplary user interface for selecting content information in a data folder for the sharing application program.

FIG. 5 is a block diagram showing an exemplary user interface 500 for selecting a data folder for the sharing application program. Shown at 502 illustrates creating a New Profile, at 504 indicates how the items are marked in My Pictures and at 506 illustrates the items selected are in a DataFolder 506.

Figure 6:
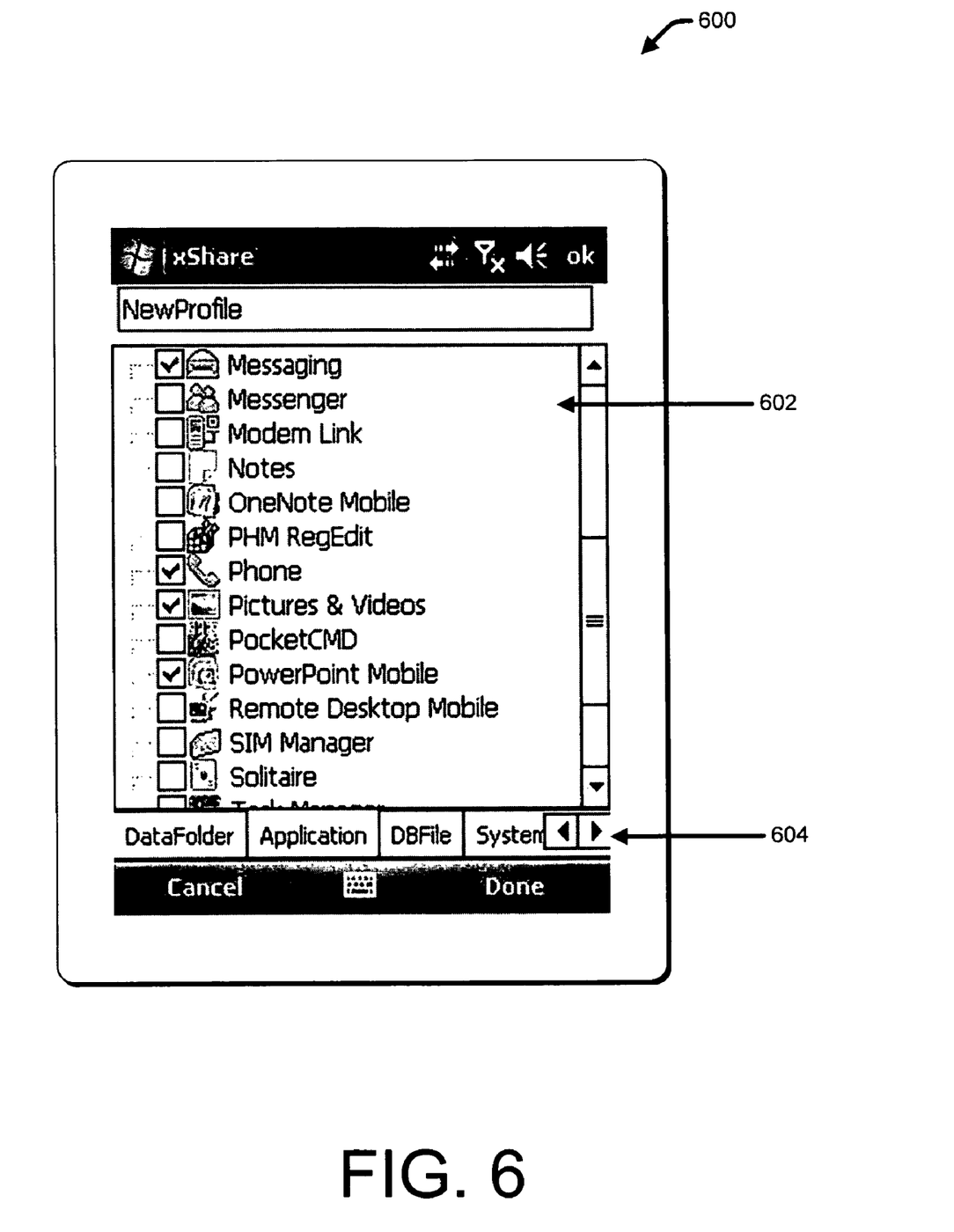
FIG. 6 is a block diagram showing an exemplary user interface for selecting an application for the sharing application program.

FIG. 6 is a block diagram showing an exemplary user interface 600 for selecting an application for the sharing application program. Shown at 602 illustrates selecting items such as Messaging, Phone, Pictures & Videos, and Power-Point Mobile to share in the Applications 604 that are selected. The owner 108 can specify whether to allow the borrower to install new applications.

Figure 7:
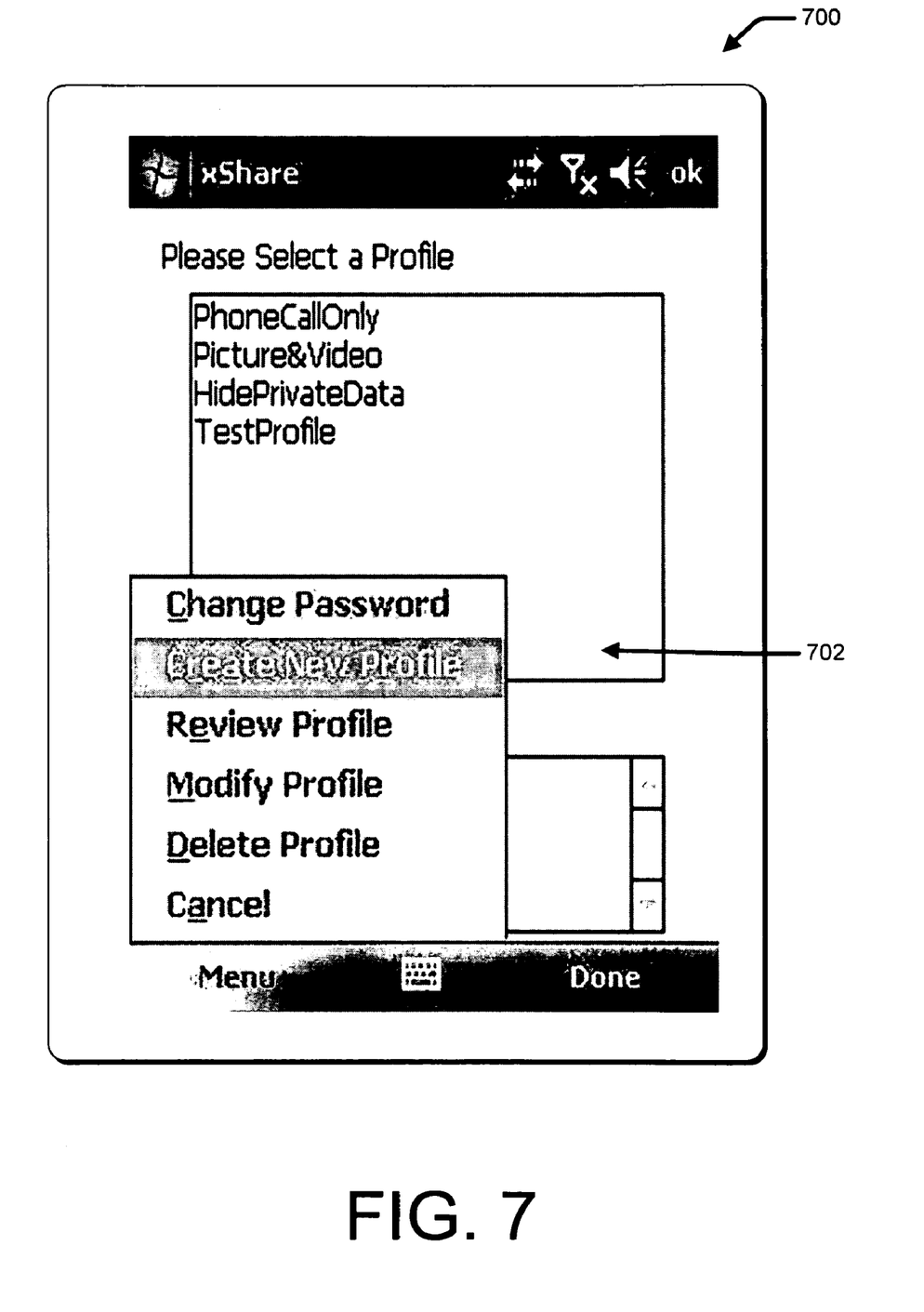
FIG. 7 is a block diagram showing an exemplary user interface for creating a profile for the shared mode for the sharing application program.

FIG. 7 is a block diagram showing an exemplary user interface 700 for creating a profile for the shared mode for the sharing application program. Shown are "Please Select a Profile" and "Create New Profile" 702.

Figure 8:
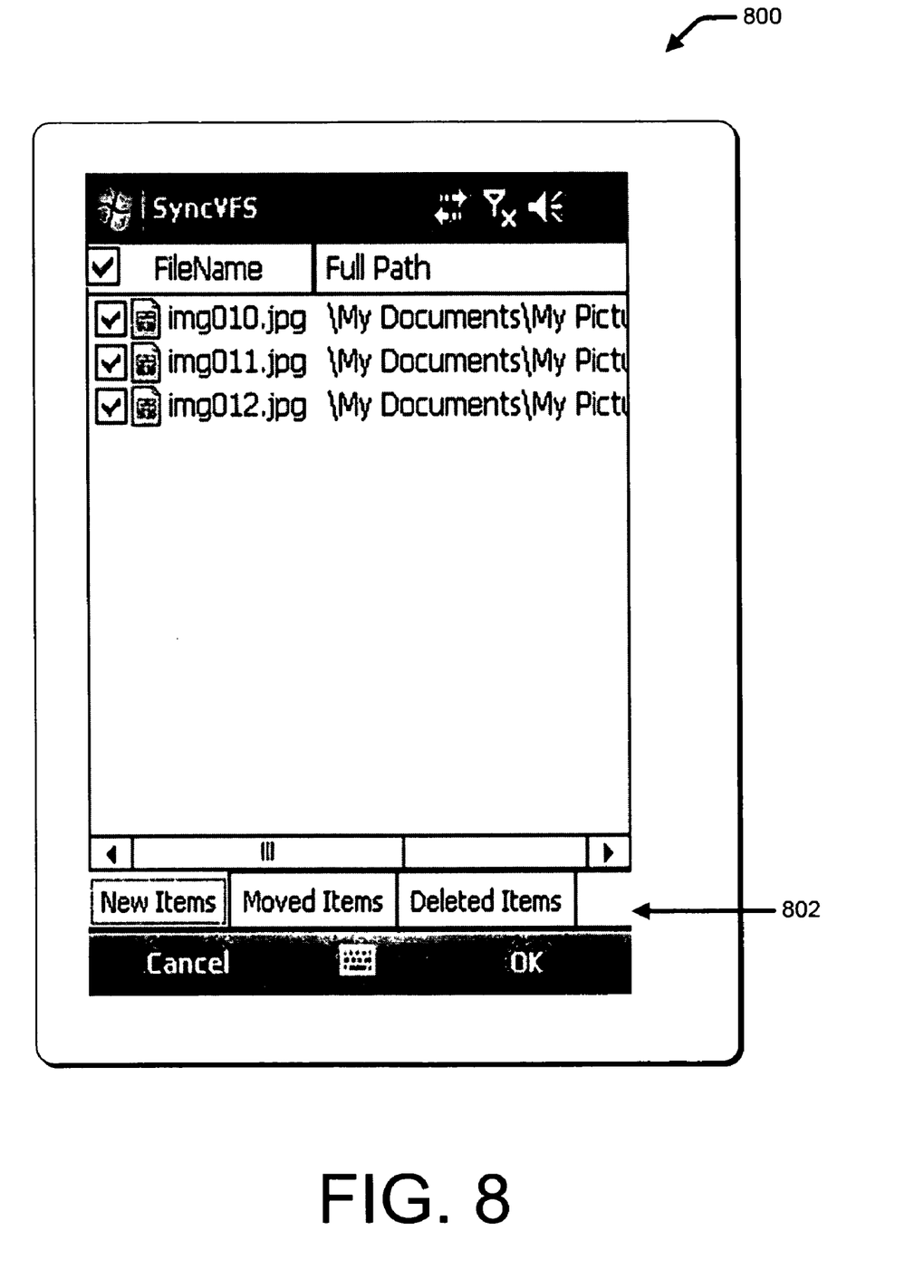
FIG. 8 is a block diagram showing an exemplary user interface for new items created in the shared mode of the sharing application program.

FIG. 8 is a block diagram showing an exemplary user interface 800 for new items 802 created in the shared mode of the sharing application program. The user interface also prevents one or more application installations and one or more USB connections to the processor.

Exemplary Process for Illustrating Shared Mode

Figure 9:
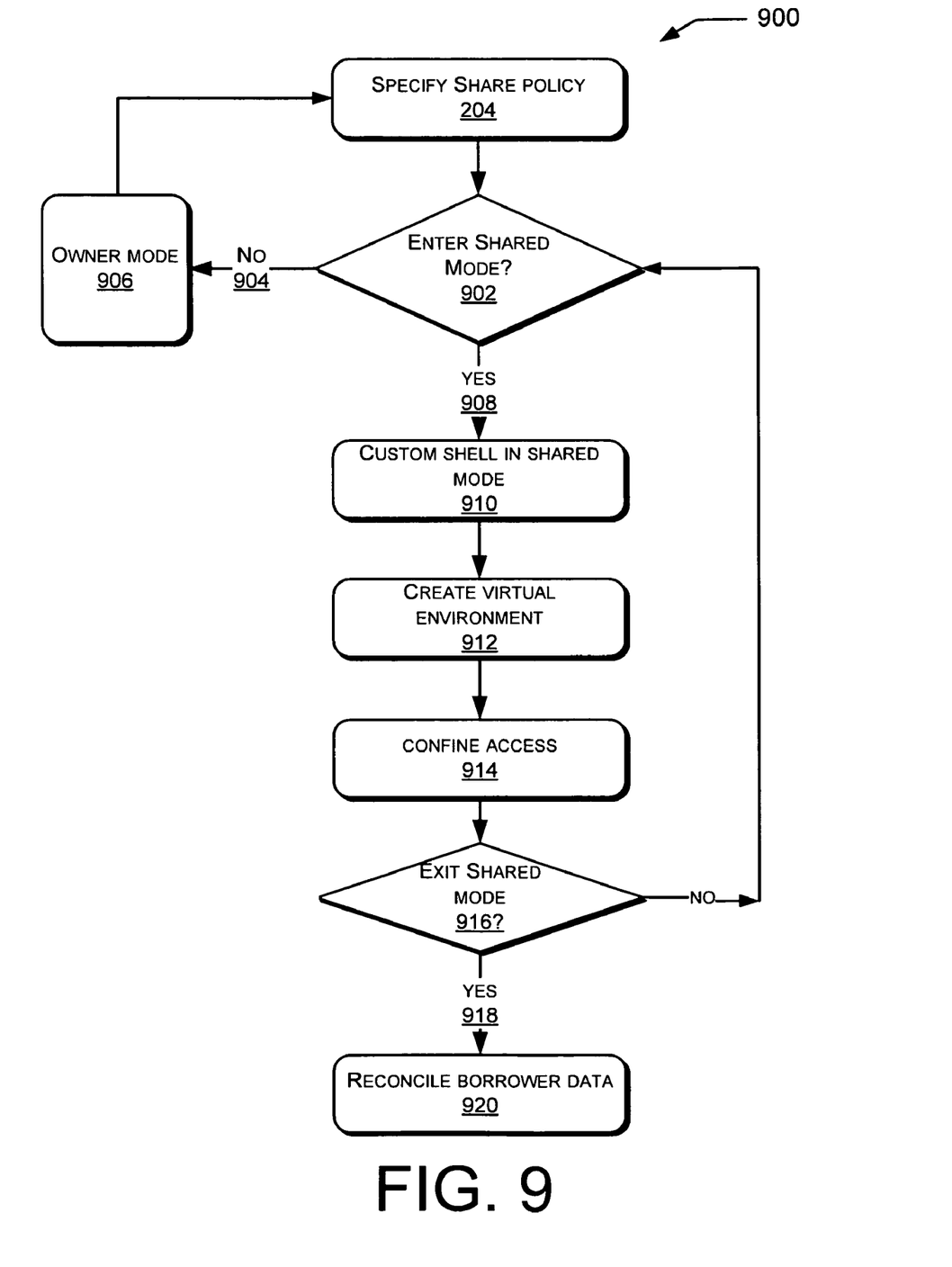
FIG. 9 is a flowchart showing an exemplary process for sharing the mobile communication device with a borrower.

FIG. 9 is a flowchart showing an exemplary process 900 for sharing the mobile communication device with the borrower. The owner 108 in the owner mode 202 establishes a sharing policy 204 including but not limited to: a shared file selection, a shared application selection, or a resource allowance specification. The process reaches a decision point, whether to enter the shared mode 902 or not.

At the decision point, if the owner 108 decides to not enter the shared mode, the process 900 takes a No branch 904 along the left side to the owner mode 906 without selecting content information. From the owner mode 906, the process 900 may return to specify share policy 204 and go through the process.

Returning to the decision point for the shared mode 902, if the owner 108 decides to enter the shared mode, the process 900 moves along the Yes branch 908 to customizing the shell in the shared mode 910 to ensure the user interface looks similar or consistent for the borrower.

Next, the process 900 presents or creates a virtual environment 912. The virtual environment 912 enables the sharing policy 204 to allow access to the one or more files located in the shared mode and simultaneously hiding access to files in the owner mode 202 that are not identified in the share policy 204. The process 900 illustrates how in the shared mode, the access is confined 914 to the borrower 110, while giving the owner 108 access control. Next, the process 900 goes to another decision point, to exit the shared mode 916 or not.

At the decision point, if the process does not exit the shared mode 916, the process 900 travels along the No branch and is in the Shared Mode 902.

Returning to Exit Shared Mode 916, if the owner 108 decides to exit the share mode, the process 900 takes the Yes branch 918 to reconcile borrower data 920. The reconcile borrower data 920 identifies one or more changes implemented to the one or more files in the shared mode by directing the one or more changes to a separate folder without modifying the one or more files in the shared mode.

Exemplary Operating System for Sharing

Figure 10:
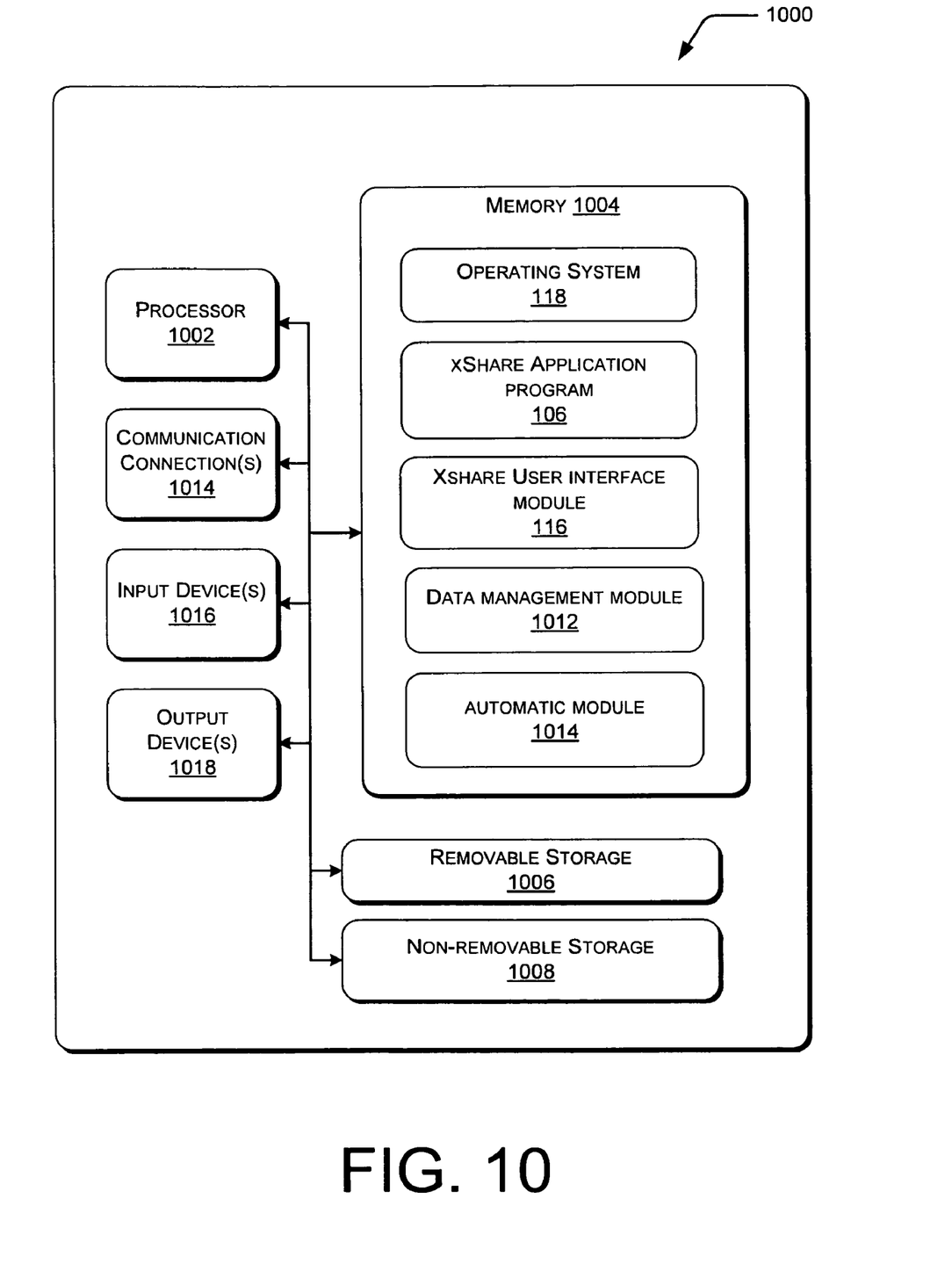
FIG. 10 is a block diagram showing details of an exemplary operating environment for implementing the sharing application program.

FIG. 10 is a schematic block diagram of an exemplary general operating system 1000. The system 1000 may be configured as any suitable system capable of implementing sharing application program 106. In one exemplary configuration, the system comprises at least one processor 1002 and memory 1004. The processing unit 1002 may be implemented as appropriate in hardware, software, firmware, or combinations thereof. Software or firmware implementations of the processing unit 1002 may include computer- or machine-executable instructions written in any suitable programming language to perform the various functions described.

Memory 1004 may store programs of instructions that are loadable, embedded, or encoded, and executable on the processor 1002, as well as data generated during the execution of these programs. Depending on the configuration and type of communication device, memory 1004 may be volatile (such as RAM) and/or non-volatile (such as ROM, flash memory, etc.). The system 1000 may also include additional removable storage 1006 and/or non-removable storage 1008 including, but not limited to, magnetic storage, optical disks, and/or tape storage. The disk drives and their associated computer-readable medium may provide non-volatile storage of computer readable instructions, data structures, program modules, and other data for the communication devices.

Turning to the contents of the memory 1004 in more detail, may include an operating system 118, one or more sharing application program 106 for implementing all or a part of the sharing application program for the mobile communication device. For example, the system 1000 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 1004 includes the sharing application program 106, a data management module 1010, and an automatic module 1012. The data management module 1010 stores and manages storage of content information, such as files, folders, applications, pictures, text messages, and the like, and may communicate with one or more local and/or remote databases or services. The automatic module 1012 allows the process to operate without human intervention.

Memory 1004, removable storage 1006, and non-removable storage 1008 are all examples of computer storage medium. Additional types of computer storage medium that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the communication device 102.

The system 1000 may also contain communications connection(s) 1014 that allow the processor 1002 to communicate with servers, the user terminals, and/or other devices on a network. Communications connection(s) 1014 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 1000 may also include input device(s) 1016 such as a keyboard, mouse, pen, voice input device, touch input device, etc., and output device(s) 1018, such as a display, speakers, printer, etc. The system 1000 may include a database hosted on the processor 1002. All these devices are well known in the art and need not be discussed at length here.

The subject matter described above can be implemented in hardware, or software, or in both hardware and software.

Although embodiments of sharing mobile communication devices have been described in language specific to structural features and/or methodological acts, it is to be understood that the subject matter defined in the appended claims is not necessarily limited to the specific features or acts described above. Rather, the specific features and acts are disclosed as exemplary forms of exemplary implementations of sharing a mobile communication device. For example, the methodological acts need not be performed in the order or combinations described herein, and may be performed in any combination of one or more acts.

The invention claimed is:

1. A computer-readable storage communication device encoded with computer instructions that, when executed by a processor, cause the processor to perform acts comprising:
   receiving a request to share the communication device from an owner mode;
   establishing a sharing policy from the owner mode, the sharing policy comprising at least one of: a shared file selection, a shared application selection, or a resource allowance specification;
   determining one or more files accessible in a shared mode based on the sharing policy;
   creating the shared mode by presenting a virtual environment to enable the sharing policy to allow access to the one or more files located in the shared mode and simultaneously hiding access to files in the owner mode that are not identified in the shared policy;
   transitioning to the shared mode in which the owner mode is no longer being active and the owner mode is no longer being viewed on a display of the communication device; and
   identifying one or more changes implemented to the one or more files in the shared mode by directing the one or more changes to a separate folder without modifying the one or more files in the owner mode.

2. The computer-readable storage communication device as recited in claim 1, further comprising stopping one or more processes running in the owner mode before creating the shared mode.

3. The computer-readable storage communication device as recited in claim 1, further comprising receiving a request to re-enter the owner mode from the shared mode, wherein a user authentication is presented as a response to the request.

4. The computer-readable storage communication device as recited in claim 1, further comprising, upon re-entering the owner mode, determining whether to modify the one or more files by applying the one or more changes implemented during the shared mode.

5. The computer-readable storage communication device as recited in claim 1, wherein the simultaneously hiding access to the file comprises creating a new file through a namespace virtualization.

6. A method executable on a processor of a mobile device, the method comprising:
   receiving, by the processor, a request to share the mobile device;
   selecting, by the processor, content information to share in one or more multiple display screens on the device, the content information comprises at least one of files, folders, pictures, videos, text messages, or applications;
   creating, by the processor, a profile mode for one or more selection choices for the content information to be shared; and
   providing, by the processor, access to the profile mode through a virtual environment for the selected choices while simultaneously concealing other parts of the content information that was not selected to be shared.

7. The method of claim 6, further comprising providing, by the processor, authentication information to switch from the profile mode to an owner mode for:
   managing and tracking, by the processor, the content information that has been modified or created; and
   accepting or rejecting, by the processor, the content information that has been modified or created.

8. The method of claim 6, further comprising providing, by the processor, authentication information to switch from the profile mode to an owner mode for:
   managing and tracking, by the processor, the content information that has been created or modified;
   accepting, by the processor, the content information that has been created; and
   rejecting, by the processor, the content information that has been modified.

9. The method of claim 6, wherein the processor comprises being located on at least one of a mobile communication device, a personal digital assistance, a laptop, or a mobile cellular phone.

10. The method of claim 6, further comprising identifying, by the processor: quotas for resources to be used for the profile, the quotas for the profile operating on the processor that is located on the device, the quotas comprising at least one of a battery usage, a unit of storage on the device, data counts used for texting, or a number of minutes for talking on the device.

11. The method of claim 6, further comprising providing, by the processor, authentication information to allow creating the profile for selecting the content information to be shared.

12. The method of claim 6, further comprising providing, by the processor, authentication information to allow returning to an owner mode from the profile mode.

13. The method of claim 6, further comprising:
   recording, by the processor, usage of minutes on the device when the profile mode is active.

14. A communication device displaying a user interface that, when executed by a processor, cause the processor to perform acts comprising:
   receiving, by the processor, a request to share the communication device;
   creating, by the processor, a profile to share content information in a shared mode on the communication device;
   identifying, by the processor, the content information that is accessible for the shared mode on the communication device;
   providing, by the processor, access to the content information for the shared mode through a virtual environment on the communication device while simultaneously concealing other parts of the content information not selected for the shared mode on the communication device; and
   managing, by the processor, the profile by tracking the content information that has been created or changed in the shared mode on the communication device.

15. The communication device displaying the user interface of claim 14, further comprising displaying, by the processor, a bar to indicate the shared mode on the communication device is active.

16. The communication device displaying the user interface of claim 14, further comprising managing, by the processor, the profile by displaying the content information that has been created or changed in the shared mode on the communication device;

accepting, by the processor, the content information that has been created; and rejecting, by the processor, the content information that has been modified.

17. The communication device displaying the user interface of claim 14, further comprising preventing, by the processor, one or more application installations and one or more USB connections to the processor.

18. The communication device displaying the user interface of claim 14, further comprising receiving, by the processor, a request to re-enter as an owner mode from the shared mode on the communication device, wherein a user authentication is presented as a response to the request.

19. The communication device displaying the user interface of claim 14, further comprising establishing, by the processor, a sharing policy in the owner mode, the sharing policy comprising at least one of: a shared file selection, a shared application selection, or a resource allowance specification.

20. The communication device displaying the user interface of claim 14, further comprising identifying, by the processor, quotas for resources to be used for the profile, the quotas for the profile operating on the processor that is located on the communication device, the quotas comprising at least one of a battery usage, a unit of storage on the communication device, data counts used for texting, or a number of minutes for talking on the communication device.

* * * * *